A. W. GEORGE.

HINGE WIRING MACHINE.

APPLICATION FILED DEC. 9, 1916.

Reissued Nov. 13, 1917.

14,393.

4 SHEETS—SHEET 1.

Witness

Chas. L. Grieshaber

Inventor

Alexander W. George,

By

Attorneys

A. W. GEORGE.

HINGE WIRING MACHINE.

APPLICATION FILED DEC. 9, 1916.

Reissued Nov. 13, 1917.

14,393.

4 SHEETS—SHEET 2.

Witness

Chas. L. Grieshaner

Inventor

Alexander W. George,

By Lupton, Cushman & Rea

Attorney

A. W. GEORGE.

HINGE WIRING MACHINE.

APPLICATION FILED DEC. 9, 1916.

Reissued Nov. 13, 1917.

14,393.

4 SHEETS—SHEET 3.

Witness

Chas. L. Grieshauer.

By

Inventor

Alexander W. George,

Lupus, Cushman & Rea

Attorneys

A. W. GEORGE.

HINGE WIRING MACHINE.

APPLICATION FILED DEC. 9, 1916.

Reissued Nov. 13, 1917.

14,393.

4 SHEETS—SHEET 4.

Inventor

Alexander W. George,

Witness

Chas. L. Griesbauer

By Lyons & Lyons

Attorneys.

UNITED STATES PATENT OFFICE.

ALEXANDER W. GEORGE, OF BROOKLYN, NEW YORK, ASSIGNOR TO TIN DECORATING COMPANY OF BALTIMORE, OF BALTIMORE, MARYLAND, A CORPORATION OF NEW JERSEY.

HINGE-WIRING MACHINE.

14,393. Specification of Reissued Letters Patent. Reissued Nov. 13, 1917.

Original No. 1,117,030, dated November 10, 1914, Serial No. 823,938, filed March 11, 1914. Application for reissue filed December 9, 1916. Serial No. 136,107.

*To all whom it may concern:*

Be it known that I, ALEXANDER W. GEORGE, a citizen of the United States, and resident of New York, borough of Brooklyn, county of Kings, State of New York, have invented certain new and useful Improvements in Hinge-Wiring Machines, of which the following is a specification.

This invention relates to improvements in machines for placing wire in boxes for providing a pintle for the hinges thereof, and has for an object to provide an improved structure which will automatically and accurately place the pintles in position.

Another object of the invention is to provide an improved cutting and inserting structure for a wire which will automatically cut and insert the proper length of wire in a box for providing a pintle for a box.

A still further object of the invention is to provide an improved wire feeding and cutting device which will cut wires in proper lengths for pintles of boxes.

In carrying out the object of the invention any suitable frame may be provided with suitable straightening rollers for wires through which wire is fed at a certain rate by an improved feeding structure set to properly coact with the severing or cutting device, and means for inserting the severed wire into a box. A suitable form of support is provided for a box which is to receive the severed wire or pintle, which form coacts with a plurality of reciprocating members with a sliding member mounted in the form, whereby when a length of wire is cut off the same may be held in proper alinement for being inserted into the box held on the form. The inserting means and the wire cutting and feeding means are connected so as to act in proper timed relationship to each other, whereby the wire feeding means will be inoperative while the severed portion of the wire is being inserted into the box, and the inserting means will be inoperative while the wire is being fed forward.

In the accompanying drawings,—

Fig. 3 is a fragmentary edge view of the adjusting means for the wire feed and associated parts;

Fig. 4 is a section through Fig. 3 on line 4—4;

Fig. 5 is a section through Fig. 1 on line 5—5;

Figure 10:
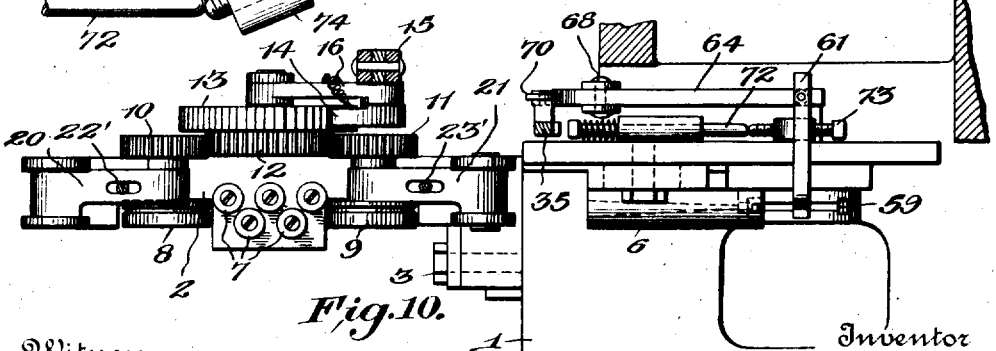
Fig. 10 is a section through Fig. 1 approximately on line 10—10.

Referring to the accompanying drawings by numeral, 1 indicates a suitable frame provided with suitable cross pieces and braces for supporting the various moving parts hereafter fully described. Connected with frame 1 is an auxiliary frame 2 which is secured in place by any desired means, as for instance a bolt 3 arranged in suitable slots so as to allow the set screw 4 to adjust the height of frame 2 as desired, whereby the wire 5 may be properly fed into the guide 6. Before the wire 5 passes into guide 6 the same passes through suitable straightening rollers 7 and also suitable feeding rollers 8 and 9. Connected with the lower feed rollers are pinions 10 and 11 (Fig. 10) which are continually in mesh with the driving pinion 12, which pinion is rigidly connected with ratchet wheel 13 operated by pawl 14, which pawl is pivotally connected with an operating bar or pitman 15. The bar or pitman 15 is connected with link 16 (Fig. 2) through pivotal pins 17 and 18, link 16 being pivotally connected on the shaft on which the ratchet wheel 13 is mounted. A spring 19 is provided which has one end connected with link 16 and the other with pawl 14, whereby pawl 14 is maintained in engagement with ratchet wheel 13. Upon an up and down movement of the pitman 15 pawl 14 will intermittently feed forward the ratchet wheel 13 and power will be transmitted therefrom to the feed rollers so as to feed the wire 5 properly through guide 6. The upper rollers 8 and 9 are mounted upon links 20 and 21, (Fig. 1) which links are pivotally mounted in the auxiliary frame 2, and which are pressed by springs 22 and 23 so as to give a proper pinching action between the feeding means as may be required for forcing the wire forward. A suitable nut is provided at the upper end of the bars 22′ and 23′ for varying the tension of the springs 22 and 23 according to the amount of tension necessary.

A particular straightening and feeding device has been described and shown, but it will be evident that any form of device could be used provided the same fed the wire 5 forward as needed, the essential part being to provide the pitman 15 and associated devices for feeding the wire 5 forward in timed relationship to the severing and inserting devices heretofore fully described.

The pitman 15 is connected with an adjusting device 24 (Fig. 3) for varying the stroke of the pitman according to the size of the box being supplied with a pintle or the length of the wire being severed. This adjusting device comprises a frame 26 rigidly secured by any desired means to a power shaft 27 so that the frame 26 will be rotated. Arranged in the frame 26 is a sliding block 27′ to which a block 28 is pivoted. Pivotally connected with block 28 is the pitman 15 but the pivotal pin passing through pitman 15 extends at a right angle to the pivotal pin passing through block 28, whereby a substantially universal joint is provided in rder to allow the pitman 15 to be inclined t one side so as to be connected with the link 16 shown in Fig. 10. The connection between link 16 and pitman 15 is the same as the connection between sliding member 27′ and pitman 15. A threaded bar 29 is provided in frame 24, which bar is formed with a squared portion 30 for receiving a wrench so as to manually rotate shaft 29 and move the sliding member 27′ which acts as a traveling nut. Arranged on the power shaft 27 and adjacent the frame 24 is a cam 31, (Fig. 5) which cam is provided with a lower surface 32, a raised surface 33 and a second raised surface or cam portion 34, portions 33 and 34 acting as cams for causing a proper swinging movement of lever 35 which is pivotally mounted at 36. A suitable anti-friction roller 37 is connected with the end of lever 35 and travels over the surfaces or portions 32, 33 and 34 as shaft 27 rotates. It will be observed that while roller 37 is in engagement with portion 32 lever 35 is stationary, but when roller 37 moves up to engage the surface 33 a quick pivotal movement will be given to lever 35 and then the lever will remain stationary until roller 37 engages the cam 34, whereupon the lever 35 will be given a further quick pivotal movement, which movement is practically a back and forth movement. After leaving cam 34 roller 37 engages surface 33 for a short distance and then moves back to surface 32. The movement of lever 35 operates certain mechanism hereinafter fully described, which mechanism must be operated in two successive movements so that two successive forward pivotal movements are given the lever 35.

Figure 1:
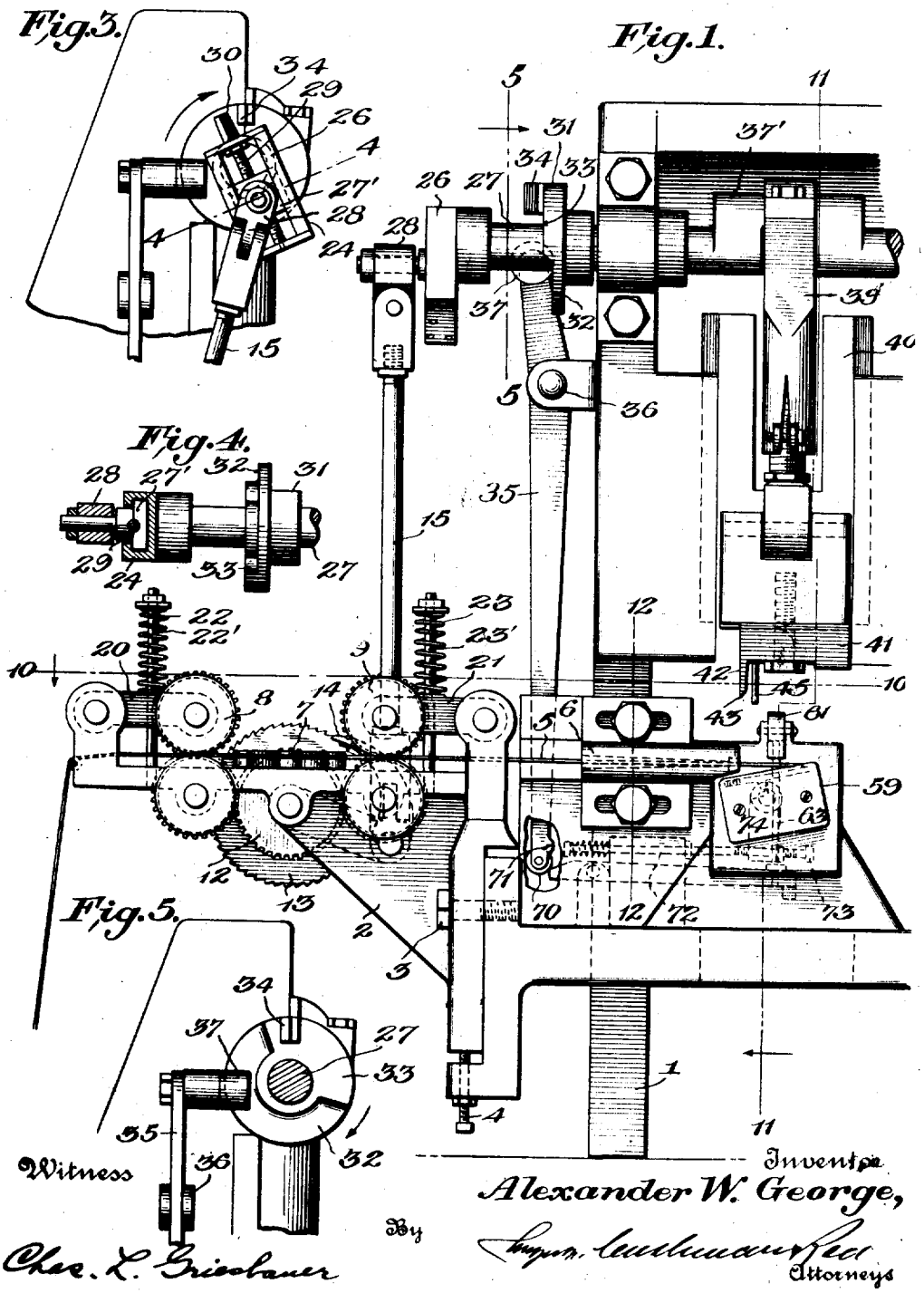
Figure 1 is a front view of a machine embodying the invention.
Figure 2:
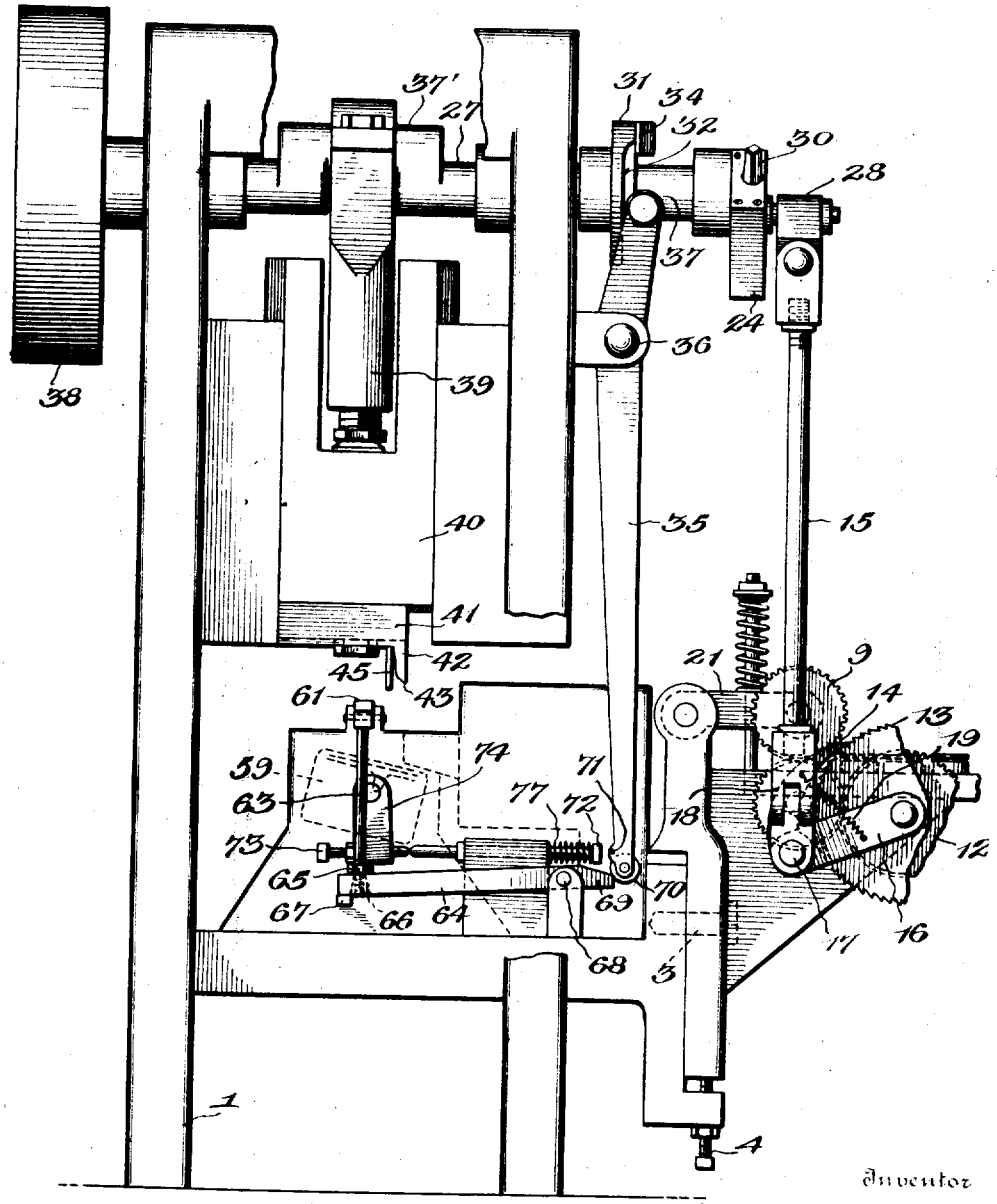
Fig. 2 is a rear view of the structure shown in Fig. 1.
Figure 6:
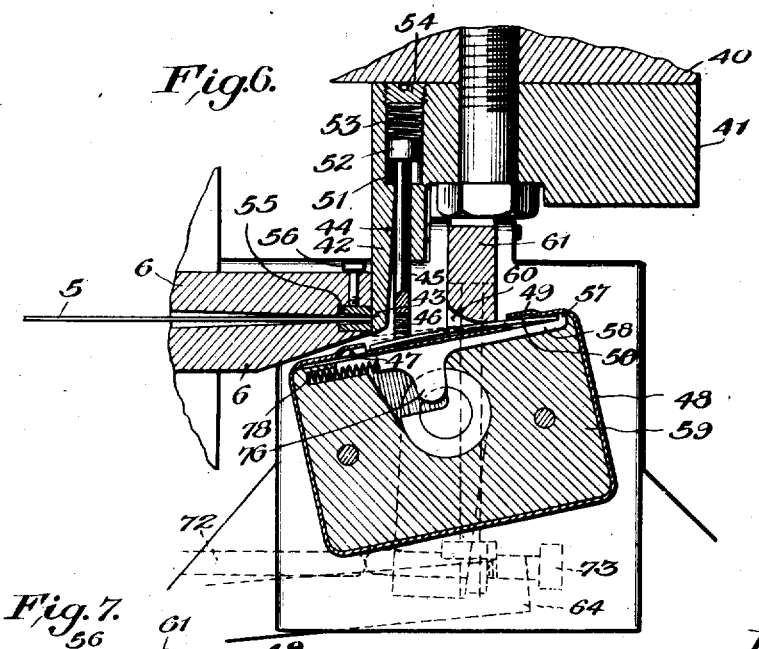
Fig. 6 is a section through Fig. 11 approximately on line 6—6.
Figure 7:
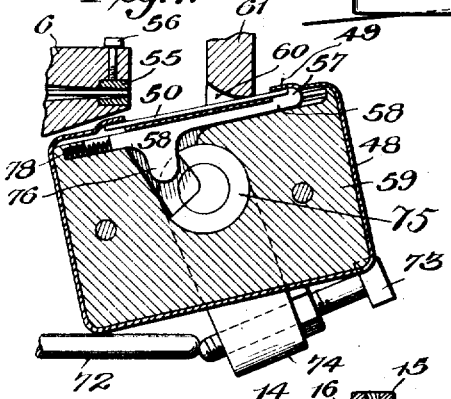
Fig. 7 is a detailed fragmentary sectional view similar to Fig. 6 showing the wire completely inserted.
Figure 8:
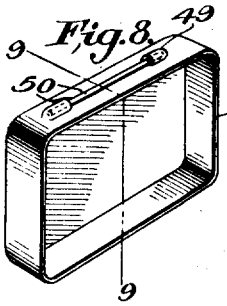
Fig. 8 is a detailed perspective view of the complete box.
Figure 9:
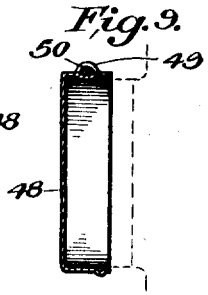
Fig. 9 is a section through Fig. 8 on line 9—9.
Figure 11:
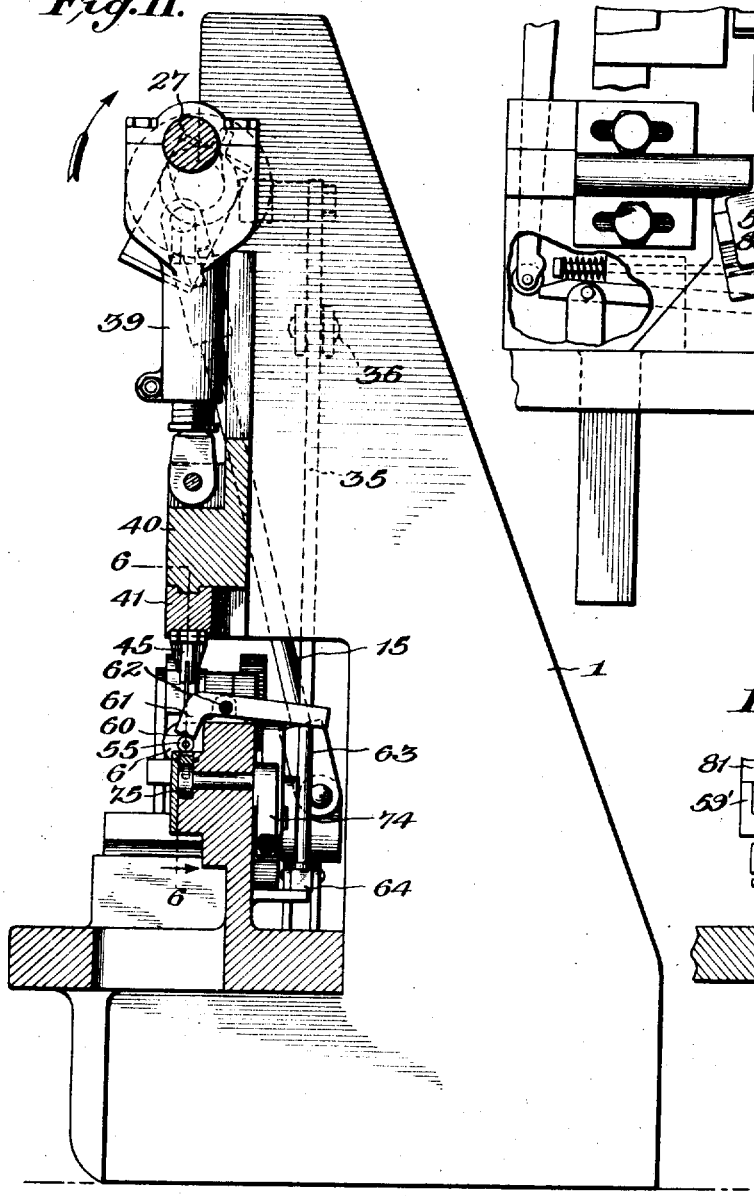
Fig. 11 is a section through Fig. 1 on line 11—11.

As shown in Fig. 1 shaft 27 in addition to carrying members 26 and 31 is provided with a crank 37′ and a power wheel 38. The crank 37′ engages a suitable pitman 39 which operates a sliding block 40 to which is connected the severing device heretofore mentioned and part of the inserting devices. Connected to the sliding block 40 is a plate 41 carrying a downwardly extending member 42 which has an extension 43 acting as a severing device or knife, and is also provided with an aperture or bore 44 in which a reciprocating member 45 is mounted, which member is bifurcated at 46 so as to straddle the portion of wire to be severed in order to guide the same properly so that the end will arrive opposite the pressed out portion 47 on box 48. The pressed out portion 47 is arranged opposite the pressed out portion 49 and acts as means for receiving one end of the pintle or severed portion 50 of wire 5. It will be evident that the knife or severing member 43 could be made integral with member 41, as shown, or could be made from a separate piece and rigidly secured thereto without departing from the spirit of the invention. The bore 44 merges into an enlarged bore 51 in which the member 45 extends, and which accommodates an enlarged end or piston 52 secured to member 45 as well as a spring 53 which presses against the piston 52 and against a plug 54. As shown in Fig. 6 the knife 43 is arranged adjacent the tubular insert 55 which is held in place by a set screw 56, and which is provided with a tapering bore converging toward the end arranged adjacent the knife. From this view it will also be observed that the guide 6 is provided with a tapering bore through which the wire passes. When the knife and associated parts are raised from the position shown in Fig. 6 to the position shown in Fig. 1 the wire feeding device operates for feeding forward the wire as shown in Fig. 1 until the end thereof strikes against the hook 57 of the sliding member 58. The knife 43 then moves downwardly and severs the wire as shown in Fig. 6. The lower end of the knife acts as a depressing member so as to depress the end of the wire from the dotted position shown in Fig. 6 to the full line position shown in said figure, after which the sliding member 58 is operated or moved longitudinally of the form 59 shown in Fig. 7, whereupon the wire 50 will be accurately positioned in the box, as shown in Figs. 8 and 9. When the wire is moved to the position shown in Fig. 1 the same passes into the notch 60 (Fig. 6) in the end of the pivotally mounted bar 61, and said bar guides the end of the wire to the position shown in Fig. 6. After the wire has been inserted as shown in Fig. 7, lever 61 is released so that the same may be raised as shown in Fig. 11. This allows the ready removal of the box from form 59 and insertion of a new box. The lever 61 is pivotally mounted at 62, as shown in Fig. 11, and is moved in one direction by rod 63 and in the opposite direction under the action of gravity, or if desired a spring could be used. Rod 63 acts to close or lower the lever to the position shown in Fig. 6 so that the lever will be moved to an operative position positively. Rod 63 has one end extending into or through a rod 64 (Fig. 2) and is provided with an adjusting nut 65 so as to adjust the height of the upper end of the rod from lever 64. It will be observed from Fig. 2 that the end of rod 63 inserted into lever 64 may have a somewhat free movement by reason of the tapering aperture 66 into which it is fitted. A suitable stop 67 is provided for limiting the downward pivotal movement of lever 64, and the upward pivotal movement thereof is limited by lever 61 when the same engages the box as shown in Fig. 6. The lever 64 is pivotally mounted at 68, and is provided with a cam surface 69 designed to co-act with the roller 70 mounted upon the vertical lever 35 pivotally mounted at 36. When the cam wheel 31 is rotated until the roller 37 is moved to the surface or cam face 33, wheel 70 will engage cam 69 on lever 64 so as to raise rod 63 and depress the end of lever 61 carrying notch 60. The parts will remain in this position until the knife 43 has severed the wire and depressed the same to the full line position shown in Fig. 6, whereupon roller 37 on lever 35 will be moved by cam 34, which movement will cause the projection 71 at the lower end of lever 35 to engage the end of the reciprocating rod 72 and move the rod 72 so that the same will move the set screw 73 and swing arm 74 a proper distance for causing the cam 75 (Fig. 7) to press against the extension 76 on the reciprocating or sliding member 58 so as to move the same to the position shown in Fig. 7. This movement is a quick movement as the cam member 31 is continually rotating and cam 34 only momentarily raises the roller 37. It will be observed that the bar 72 is provided with a spring 77 which brings the bar back to its former position when moved therefrom. The set screw or adjusting member 73 may be adjusted as desired for causing a sooner or later engagement of the bar 72 therewith. From Figs. 6 and 7 it will be noted that a spring 78 is provided in the form 59 for moving the sliding member 58 back to its original position, as shown in Fig. 6, as soon as cam 75 moves out of the way. In the drawings, a certain size box is disclosed, and a form 59 is disclosed for fitting the box, but it will be evident that a larger or smaller box could be provided with a wire pintle without departing from the spirit of the invention. All that will be necessary to operate the machine for placing a larger or smaller wire in position would be to vary the size of the wire to be severed by suitably adjusting the throw of pitman 15 and the position of the hook 57. If it is desired to place a wire in a different size box a different size form must be used which may be easily substituted for form 59 as form 59 is preferably held in place by screws. In addition to changing the size of the form for a different size box the pitman 15 must be also adjusted so as to feed the proper length of wire. It will also be noted that in case the machine is to be used merely as a wire cutting device so that the wires may be inserted by hand the form 59 may be omitted or removed and the end of the wire severed or cut off in the regular way.

Figure 13:
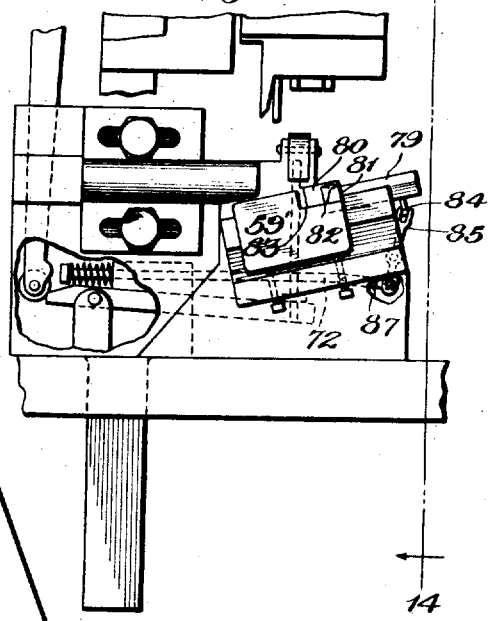
Fig. 13 is a fragmentary side view of a slightly modified form of the invention.
Figure 14:
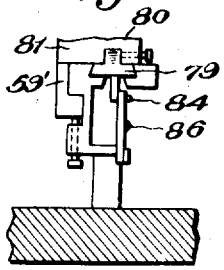
Fig. 14 is a fragmentary sectional view approximately on line 14—14 of Fig. 13.
Figure 12:
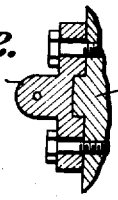
Fig. 12 is a fragmentary sectional view through Fig. 1 approximately on line 12—12.

In Figs. 13 and 14 will be seen a slightly modified form of the invention in which a sliding bar 79 is provided instead of a sliding member 58. This sliding bar carries a block 80 provided with an extension 81 which is formed with a notch 82. Notch 82 acts in the same capacity as hook 57 shown in Fig. 6, and moves with the sliding member 79. A notch 83 is cut out of the form 59′ so as to accommodate the projection 81. The sliding or back and forth movement of the projection 81 is to cause a longitudinal movement of the wire as shown in Figs. 6 and 7. The slide 79 is provided with a projection 84 engaged by a bifurcated lever 85, which lever is pivoted at 86, and is operated by the rod or bar 72 through a link 87 which is pivotally connected to the bar 72 and to lever 85.

What I claim is:

1. In a machine of the class described, means for holding a box having pintle receiving openings, means for feeding a wire adjacent said box, means for cutting a section off of said wire, means for directing one end of said wire into one of said pintle openings, a guiding member for holding the severed section of said wire adjacent said box, and means for giving said severed section a reverse movement for forcing the severed end into the other of said pintle openings.

2. In a machine of the class described, a form for receiving a box provided with pressed out open-ended portions, means for feeding a wire to a position adjacent said box, means for guiding said wire so that one end will enter one of said pressed out portions, means for severing a section from said wire, and means for moving said section longitudinally so that the opposite end of the wire will be positioned in the other pressed out portion.

3. In a machine of the class described, a wire feeding mechanism, a form co-acting therewith for receiving a box provided with wire receiving openings, a slide arranged on said form, a plunger co-acting with said form, said plunger being provided with a cutter for severing a section from said wire, and with means for guiding said section to said sliding member and one end thereof into one of the openings in said box, and means co-acting with said cutter and the wire feeding mechanism for moving said sliding member so as to give said section a reverse movement so that the opposite end of the section will be positioned in the other opening in said box.

4. In a machine of the class described, a wire feeding device, means for straightening said wire, a guide for guiding said wire so that the end will extend to a particular point, means for severing a section of said wire near the end thereof, and means for moving said severed section so that one end of the same will be inserted into one end of a box arranged adjacent thereto, and means for giving said section a reverse movement so that the opposite end of said section will be moved through the opening in said box adjacent the opposite end thereof 5. In a machine of the class described, a stationary form for receiving a box having a pair of openings, a slide associated with said stationary form provided with a wire receiving portion, means for guiding a wire so that one end will enter one of the openings in said box and engage the wire receiving portion in said sliding member, means for severing a section from said wire, and means for actuating said sliding bar so as to give said section a reverse movement whereby the end opposite that engaged by said wire receiving portion is forced into the other of said openings.

6. In a machine of the class described, a form for receiving a box having pressed out open-ended pintle receiving portions, means for moving a wire toward said form, means for guiding said wire so that the end will enter one of said pressed out portions of the box arranged on said form, means acting in timed relationship with said feeding means for severing a section from said wire, and a sliding member engaging the end of said wire inserted into said pressed out portion and moving said wire so that the opposite end will engage the opposite pressed out portion.

7. In a machine of the class described, a form provided with an opening, said form being adapted to receive a box provided with a pair of pintle openings, a sliding member arranged in the opening in said form, a spring for moving said sliding member in one direction, an oppositely operated cam member for moving said sliding member in the opposite direction, said sliding member being formed with a hook at one end, means for feeding severed sections of wire to said sliding member, and so that one end will engage said hook, said means forcing the end of said severed section engaging said hook through one of said pintle openings, and means for guiding said severed section so that the opposite end thereof will be inserted into the other of said pintle openings when said cam member moves said sliding member.

8. In a machine of the class described, a form for receiving a box provided with open-ended pintle receiving portions, a sliding member formed with a hook at one end arranged in said form, means for guiding the end of a wire so as to engage said hook, means for severing a section of said wire and pressing the same toward said form, and means for operating said sliding member for moving said wire longitudinally in order that both ends may be arranged in said pintle engaging portions.

9. In a machine of the class described, a wire feeding mechanism, a box receiving form, means for guiding the end of said wire so as to engage a certain point in said box-receiving form, means for severing a section from said wire, a sliding member for moving said section longitudinally so as to cause the same to engage open-ended pintle receiving portions on a box positioned on said form, and means for actuating said sliding member, means comprising a cam adapted to rock, an arm for rocking said cam, a reciprocating member for actuating said arm, a pivotally mounted lever for actuating said reciprocating member, a rotatable cam for actuating said lever, and means for rotating said cam.

10. In a machine of the class described, a wire feeding mechanism for feeding the wire intermittently, a form arranged adjacent said means, said form being designed to receive a box having pintle receiving openings, means for guiding the end of said wire as the same is moved by said feeding means so that said end will be inserted into one of said pintle receiving openings, a cutter for cutting off a section from the end of said wire, means engaging said severed section for moving the same in a reverse direction, a cam for actuating said means, and a plurality of mechanism for actuating said cam, said mechanism causing said cam to be actuated in timed relationship to the action of said feeding means, and a guiding member engaging said section of wire for guiding the same into the other of said pintle openings when moved in a reverse direction.

11. In a machine of the class described, a form for receiving a box having a pair of apertures, means for feeding a wire so that one end will project into one of the openings in said box, means for severing and guiding the severed section to a point adjacent said box, and means for moving said severed section longitudinally in a reverse direction for inserting the other end of said section into the remaining opening, said severing and guiding means directing the movement of said section.

12. In a machine of the class described, a form for receiving a box having a pair of openings, means for feeding a wire so that the end of the wire will enter one of said openings, a knife for severing a section of said wire and forcing the severed end to a position near said box, and means arranged in said form for moving said section longitudinally in a reverse direction to the way it was originally moved for forcing the end of said section into the other of said openings.

13. In a machine of the class described, a form for receiving a box having open-ended pressed out portions, means for feeding a wire so that one end will enter one of said pressed out portions, a knife for severing a section from said wire and moving the severed end of the section to a point adjacent said box, and a reciprocating member engaging one end of the severed portion for moving the same longitudinally in a reverse direction to its first movement for forcing said severed end into the other of said pressed out portions.

14. In a machine of the class described, a form for receiving a box having a pair of openings, means for feeding a wire so that one end will enter one of said openings, a knife for severing a section from the end of said wire and moving the severed end of the severed section to a position adjacent said box, means for guiding said severed section so that the same will be positioned on said form at a predetermined place, and a sliding member engaging one end of said section, said sliding member being adapted to move said severed section in a reverse direction to the movement caused by said wire feeding means for causing the severed end of said section to enter the other of said openings.

15. In a machine of the class described, a form for receiving a box having a pair of openings, means for feeding a wire so that one end thereof will enter one of the openings in said box, a knife for cutting the end portion of said wire and forcing the severed portion to a position adjacent said box, a plurality of substantially bifurcated members for guiding the severed section of wire to a predetermined position adjacent said box, and a sliding member for moving said severed section of wire in a reverse direction to the movement caused by said wire feeding means for causing the severed end of said section to enter the other of said openings.

16. The combination with a support adapted to hold a box which has pintle-receiving portions, of means for inserting one end of a pintle in one of said receiving portions, and means for subsequently inserting the other end of the pintle in another of said receiving portions whereby said pintle will be connected with the box.

17. In a machine of the class described, the combination of a support for a box to receive a pintle, of a member slidable relative to the support and having a pintle-engaging hook at one end, and a spring engaging the opposite end of the member and acting to draw said member into a certain position.

18. The combination with a support for a box having two spaced pintle receiving portions, of means for inserting one end of a pintle in one of said receiving portions, and means for subsequently causing a relative movement between the pintle and the support for inserting the other end of the pintle in the other receiving portion.

19. The combination with a support for a box having pintle receiving portions, means for moving the pintle in one direction to insert one end of the pintle in one of the receiving portions, and means for subsequently bodily moving the pintle in the opposite direction to insert the other end of the pintle in another of said receiving portions.

20. The combination with a support for a box which has pintle-receiving portions, of means carried by the support for moving a pintle to insert an end thereof into one of said pintle receiving portions.

21. The combination with a support for a box which has a pintle-receiving portion, means movable on the support for engaging a pintle, and means for actuating the pintle-engaging means to move the latter to cause the insertion of a pintle in a pintle receiving portion of the box.

22. The combination with a support for a box, of means carried by the support for bodily shifting a pintle to insert one end of said pintle in a pintle receiving portion of the box.

23. The combination with a support for a box to receive a pintle, of mechanism for imparting movement to the pintle in two directions to insert both ends of the pintle in pintle-receiving portions of the box.

24. The combination with a support for a box to receive a pintle, of means for causing a relative movement in two directions between the pintle and the box for inserting both ends of the pintle in pintle receiving portions of the box.

25. The combination with a support for a box which is to receive a pintle, of mechanism for causing a relative longitudinal movement between the box and a pintle whereby both ends of the pintle will be inserted in spaced pintle-receiving portions of the box.

26. The combination with a support for a box which is to receive a pintle, of a sliding pintle engaging member carried by the support, and means for imparting a sliding movement to said member to cause the latter to insert one end of an adjacent pintle in a pintle receiving portion of the box.

27. The combination with a support for a box which is to receive a pintle, of a sliding member engaging member carried by the support, means for moving said member bodily in one direction to cause said member to insert an end of an adjacent pintle in a pintle receiving portion of the box, and means for moving the member in the opposite direction to restore it to its first position.

28. In a machine of the class described, the combination with a support for a box which is to receive a pintle, of a member slidable relative to the support and having a hook at one end thereof adapted to receive an end of a wire from which the pintle is to be cut, a spring engaging the other end of such member and adapted to yield in one direction when the sliding movement is imparted to the member by forcing an end of the wire against the hook, and a cutter device for severing the wire to form the pintle when the end of such wire is so forced against the hook.

Signed at New York city, in the county of New York, State of New York, this 4th day of December, 1916.

ALEXANDER W. GEORGE.